（12） United States Patent
Shinada et al.

(10) Patent No.: US 9,296,886 B2
(45) Date of Patent: Mar. 29, 2016

(54) METHOD FOR DISSOLVING AND DEGASSING POLYMER, AND METHOD FOR PRODUCING POROUS FILM

(75) Inventors: Katsuhiko Shinada, Aichi (JP); Masahiko Mizuta, Aichi (JP)

(73) Assignee: MITSUBISHI RAYON CO., LTD., Tokyo (JP)

(*) Notice: Subject to any disclaimer, the term of this patent is extended or adjusted under 35 U.S.C. 154(b) by 0 days.

(21) Appl. No.: 14/112,237

(22) PCT Filed: Apr. 19, 2012

(86) PCT No.: PCT/JP2012/060563
§ 371 (c)(1),
(2), (4) Date: Dec. 9, 2013

(87) PCT Pub. No.: WO2012/144555
PCT Pub. Date: Oct. 26, 2012

(65) Prior Publication Data
US 2014/0128517 A1  May 8, 2014

(30) Foreign Application Priority Data

Apr. 19, 2011  (JP) ................................. 2011-092826
Apr. 19, 2011  (JP) ................................. 2011-092827

(51) Int. Cl.
*D01D 1/04* (2006.01)
*D01F 6/76* (2006.01)
*C08L 27/16* (2006.01)
*C08J 3/09* (2006.01)

(52) U.S. Cl.
CPC .. *C08L 27/16* (2013.01); *C08J 3/09* (2013.01); *C08J 2300/00* (2013.01); *C08J 2327/08* (2013.01); *C08J 2339/06* (2013.01)

(58) Field of Classification Search
CPC ............. C08L 27/16; D01D 1/04; D01F 6/76
USPC .................... 524/233, 386, 104, 516
See application file for complete search history.

(56) References Cited

U.S. PATENT DOCUMENTS

2006/0205309 A1* 9/2006 Mabuchi et al. .............. 442/338

FOREIGN PATENT DOCUMENTS

| JP | 01-229037 | 9/1989 |
| JP | 11-019491 | 1/1999 |
| JP | 2003-320228 | 11/2003 |
| JP | 2006-230459 | 9/2006 |
| JP | 2007-105700 | 4/2007 |
| JP | 2010-174422 | 8/2010 |
| JP | 2010-253470 | 11/2010 |

OTHER PUBLICATIONS

"International Preliminary Report on Patentability; this report contains the following items :Form PCT/IB/373, PCT/ISA237(cover sheet), PCT/ISA237(Box No. I),PCT/ISA237(Box No. V),PCT/ISA237(Box No. VIII)", mailed on Oct. 22, 2013, which is English translation of "Written Opinion of the International Searching Authority", p. 1-p. 14.

"International Search Report (Form PCT/ISA/210)", mailed on Jul. 24, 2012, with English translation thereof, p. 1-p. 4.

\* cited by examiner

*Primary Examiner* — James J Seidleck
*Assistant Examiner* — Deve E Valdez
(74) *Attorney, Agent, or Firm* — Jianq Chyun IP Office

(57) ABSTRACT

A method for dissolving and degassing a polymer is described, including a dissolution/degassing step. In the dissolution/degassing step, a mixture containing the polymer and a solvent is agitated, in a pressure-reduced condition with a gauge pressure of −50 to −90 kPa and at a temperature lower than the boiling point of the solvent in the pressure-reduced condition but higher than the freezing point of the same, to dissolve the polymer and simultaneously degas the polymer solution, so as to obtain a polymer solution.

10 Claims, 1 Drawing Sheet

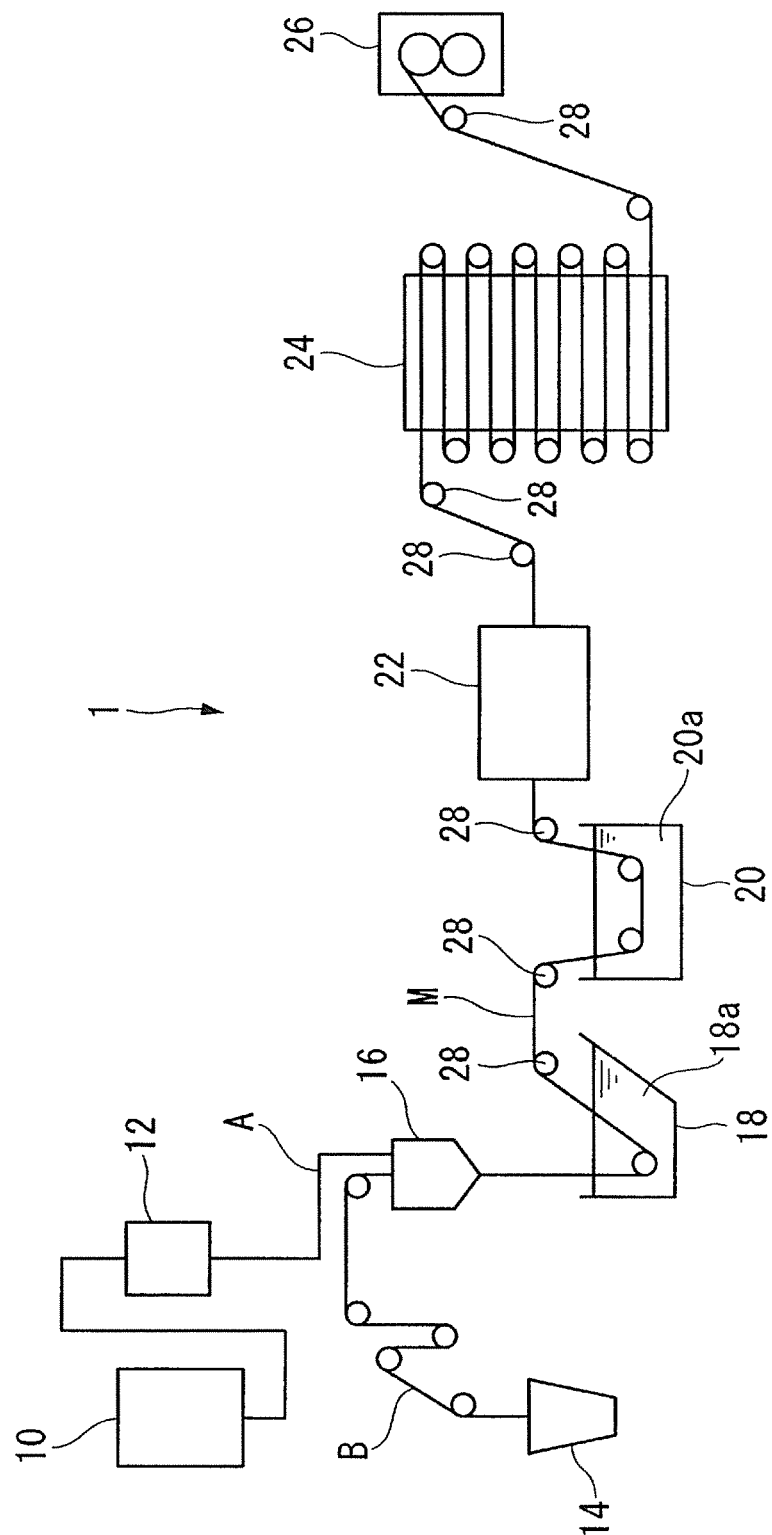

METHOD FOR DISSOLVING AND DEGASSING POLYMER, AND METHOD FOR PRODUCING POROUS FILM

CROSS-REFERENCE TO RELATED APPLICATION

This application is a 371 application of an International PCT application serial no. PCT/JP2012/060563, filed on Apr. 19, 2012, which claims the priority benefits of Japan Application No. 2011-092826 filed on Apr. 19, 2011 and Japan Application No. 2011-092827 filed on Apr. 19, 2011. The entirety of each of the above-mentioned patent applications is hereby incorporated by reference herein and made a part of this specification.

BACKGROUND OF THE INVENTION

1. Field of the Invention

This invention relates to a method for dissolving and degassing a polymer and a method for producing a porous film.

2. Description of Related Art

In the food industry, the medical industry, the electronic industry and so on, microfiltration films, ultrafiltration films, reverse-osmosis filtering films or the like that adopt porous films are used in most cases for the purpose of concentration, recycling useful ingredients, removing undesired ingredients, fresh water generation and so on. For the production of porous films, film-forming resins such as cellulose acetate, polyacrylonitrile, polysulfone, and fluorine-based resins are used.

As a method for producing a porous film, a method comprising the following steps has been known (e.g., Patent Documents 1 to 4).

Dissolution step: a step of dissolving a film-forming resin and a pore former in a solvent to obtain a film-forming starting solution.

Degassing step: a step of degassing the film-forming starting solution.

Solidification step: a step of discharging the degassed film-forming starting solution from a discharge means (e.g., a spinning nozzle, a T die or the like) and solidifying the same in a Solidification liquid to form a porous film.

In the dissolving step and the degassing step, dissolving the film-forming resin and the pore former sufficiently in the solvent and degassing the solution sufficiently have a significant influence on the quality of the porous film. However, if these steps take a long period of time, the solvent would evaporate to the environment and the quality of the film-forming starting solution would be degraded, and also the productivity would be decreased.

PRIOR ART DOCUMENTS

Patent Documents

Patent Document 1: Japanese Patent Publication No. Hei 11-19491

Patent Document 2: Japanese Patent Publication No. 2007-105700

Patent Document 3: Japanese Patent Publication No. 2010-253470

Patent Document 4: Japanese Patent Publication No. 2003-320228

SUMMARY OF THE INVENTION

Problem to be Solved by the Invention

An object of this invention is to provide a method for dissolving and degassing a polymer that, during preparation of a film-forming starting solution for forming a porous film, for example, can dissolve the polymer in the solvent efficiently and degas the polymer solution. Thereby, not only the evaporation amount of the solvent can be suppressed, but also a polymer solution of a good quality can be obtained.

Further, another object of this invention is to provide a porous film production method that not only suppresses the evaporation amount of the solvent but also allows the film-forming starting solution to be prepared within a shorter period of time, so that the porous film of an adequate quality can be produced with high productivity.

Means to Solve the Problem

A first aspect of this invention adopts the following constitutions to solve the aforesaid problems.

[1] A method for dissolving and degassing a polymer, comprising: a dissolution/degassing step comprising: agitating a mixture containing the polymer and a solvent, in a pressure-reduced condition with a gauge pressure of −50 to −90 kPa and at a temperature lower than the boiling point of the solvent in the pressure-reduced condition but higher than the freezing point of the same to dissolve the polymer and simultaneously degas the solution of the polymer, so as to obtain a polymer solution.

By fulfilling the aforesaid limitations, the polymer can be dissolved in the solvent efficiently and the polymer solution can be degassed during, for example, preparation of a film-forming starting solution for producing a porous film.

[2] The method for dissolving and degassing a polymer of [1], wherein after the pressure-reduced condition with the gauge pressure of −50 to −90 kPa is achieved in the dissolution/degassing step, a pressure reduction means is stopped while the pressure-reduced condition is maintained, and the mixture is agitated at the temperature lower than the boiling point of the solvent in the pressure-reduced condition but higher than the freezing point of the same.

By stopping the pressure reduction means and agitating the solution in a sealed state while the pressure-reduced condition is maintained, evaporation of the solvent can be suppressed to ensure a constant concentration of the polymer solution.

[3] The method for dissolving and degassing a polymer of [2], wherein the dissolution/degassing step is performed at a temperature of 50° C. to 90° C.

By performing the dissolving and degassing at a temperature lower than the boiling point, the polymer solution will not splash, so troubles caused by carbonization of the polymer adhering to the wall surfaces of the dissolving and degassing container are reduced.

[4] The method for dissolving and degassing a polymer according to [3], wherein the agitation is performed for 60 to 240 minutes.

By fulfilling the aforesaid limitations, the dissolution and degassing can be performed sufficiently.

[5] The method for dissolving and degassing a polymer of [4], wherein the dissolution/degassing step is performed using, as an agitation device, a three-axis mixer comprising a scraping mixer, a dispersing mixer and a homo-mixer.

By using the three-axis mixer, the dissolution and degassing can be performed more efficiently than cases where a uni-axis mixer or a bi-axis mixer is used.

[6] The method for dissolving and degassing a polymer of [5], wherein the rotational speed of the scraping mixer is 10 to 22 $min^{-1}$, and the rotational speed of the dispersing mixer and the homo-mixer is 750 to 1400 $min^{-1}$.

By rotating the scraping mixer, which requires a high torque, at a low rotational speed and rotating the other mixers, which require high-speed rotation, at a high rotational speed, the dissolution and degassing can be accomplished efficiently.

[7] The method for dissolving and degassing a polymer of [6], wherein the rotational speed of the dispersing mixer and the homo-mixer is increased stepwise with an interval of 1 to 300 seconds from 750 $min^{-1}$.

By fulfilling the aforesaid limitations, a high rotational speed can be set without damaging the agitation device when a highly viscous solution is agitated.

[8] The method for dissolving and degassing a polymer of [7], wherein the scraping mixer has a scraper for scraping away the polymer adhering to the inner walls of a dissolution/degassing container.

By fulfilling the aforesaid limitations, the highly viscous polymer solution adhering to the wall surfaces of the dissolution container can be physically scraped away easily.

[9] The method for dissolving and degassing a polymer of [8], wherein at least one polymer selected from a powder-like polymer and a pellet-like polymer is used as the polymer.

By fulfilling the aforesaid limitations, the evaporation amount of the solvent can be reduced and also the polymer solution can be prepared within a shorter period of time, so that a porous film of an adequate quality can be produced in high productivity.

[10] The method for dissolving and degassing a polymer of [9], wherein the solvent, the powder-like polymer, and the pellet-like polymer are added into the dissolution/degassing container in sequence and then the mixture begins to be agitated by the agitation device.

By fulfilling the aforesaid limitations, the polymer solution can be prepared with less non-dissolved substance after the agitation.

[11] The method for dissolving and degassing a polymer of [10], wherein the solvent is N,N-dimethyl acetamide or 4-methyl-2-pyrrolidone.

By fulfilling the aforesaid limitations, the polymer solution can be prepared with less non-dissolved substance after the agitation.

[12] The method for dissolving and degassing a polymer of [11], wherein the solvent is N,N-dimethyl acetamide.

By fulfilling the aforesaid limitations, the polymer solution can be prepared with less non-dissolved substance after the agitation.

[13] A method for dissolving and degassing a polymer, comprising: a degassing step for, after the dissolution/degassing step of [2], agitating the polymer solution for degassing purpose while the pressure reduction is ongoing in the pressure-reduced condition with the gauge pressure of −50 to −90 kPa at a temperature lower than the boiling point of the solvent in the pressure-reduced condition but higher than the freezing point of the same.

By fulfilling the aforesaid limitations, the degassing time can be shortened, and troubles of the dissolution/degassing device can be prevented.

[14] A method for producing a porous film, comprising: a solidification step for solidifying the polymer solution, which is obtained by the method for dissolving and degassing a polymer of any of [1] to [12], in a solidification liquid to form the porous film.

By fulfilling the aforesaid limitations, a leak caused by non-dissolved substances due to insufficient dissolution, defects caused by insufficient degassing, and troubles of the dissolution/degassing device can be prevented.

A second aspect of this invention adopts the following solution to solve the aforesaid problems.

[1] A method for dissolving and degassing a polymer that dissolves the polymer in a solvent and degasses the polymer solution, the method comprising: a dissolution/degassing step for agitating a mixture containing the polymer and a solvent, in a pressure-reduced condition with a gauge pressure of −50 to −90 kPa and at a temperature lower than the boiling point of the solvent in the pressure-reduced condition bur higher than the freezing point of the same, to dissolve the polymer and simultaneously degas the solution of the polymer, so as to obtain a polymer solution.

[2] A method for producing a porous film, comprising: a starting solution preparation step for preparing a film-forming starting solution by agitating a mixture containing a polymer and a solvent, in a pressure-reduced condition with a gauge pressure of −50 to −90 kPa and at a temperature lower than the boiling point of the solvent in the pressure-reduced condition but higher than the freezing point of the solvent, to dissolve the polymer and simultaneously degas the polymer solution; and a solidification step for solidifying the film-forming starting solution in a solidification liquid to form the porous film.

[3] The method for producing a porous film of or [1]or [2], wherein the solvent is N,N-dimethyl acetamide.

A third aspect of this invention adopts the following constitutions to solve the aforesaid problems.

[1] A method for dissolving and degassing a polymer that dissolves the polymer in a solvent and degasses the polymer solution, the method comprising: a degassing step including agitating a polymer solution formed by dissolving the polymer in the solvent to degas the polymer solution, in a pressure-reduced condition with a gauge pressure of −50 to −90 kPa and at a temperature lower than the boiling point of the solvent in the pressure-reduced condition but higher than the freezing point of the same.

[2] The method for dissolving and degassing a polymer of [1], comprising a dissolution/degassing step for, prior to the degassing step but after the pressure-reduced condition with the gauge pressure of -50 to -90 kPa is achieved, stopping the pressure reduction, agitating the mixture containing the polymer and the solvent to degas the polymer solution while the pressure-reduced condition is maintained at a temperature lower than the boiling point of the solvent in the pressure-reduced condition but higher than the freezing point of the same.

[3] A method for producing a porous film, comprising: a starting solution preparation step for preparing a film-foiming starting solution by dissolving a polymer in a solvent and degassing the polymer solution; and a solidification step for solidifying the film-foiming starting solution in a Solidification liquid to foam the porous film, wherein the starting solution preparation step comprises: a degassing step for agitating the film-forming starting solution to degas the polymer solution, in a pressure-reduced condition with a gauge pressure of −50 to −90 kPa and at a temperature lower than the boiling point of the solvent in the pressure-reduced condition but higher than the freezing point of the same.

[4] The method for producing a porous film of [3], wherein the starting solution preparation step comprises a dissolution/degassing step for, prior to the degassing step but after the pressure-reduced condition with the gauge pressure of −50 to −90 kPa is achieved, stopping the pressure reduction and agitating the liquid containing the polymer and the solvent to degas the polymer solution while the pressure-reduced condition is maintained at a temperature lower than the boiling point of the solvent in the pressure-reduced condition but higher than the freezing point of the same so as to produce the film-forming starting solution.

[5] The method for producing a porous film of [3] or [4], wherein the solvent is N,N-dimethyl acetamide.

Effects of this Invention

According to the method for dissolving and degassing a polymer of this invention, during preparation of a film-forming starting solution for forming a porous film, for example, the polymer can be dissolved in the solvent efficiently and the polymer solution can be degassed. According to the method for dissolving and degassing a polymer of this invention, by dissolving the polymer in the solvent efficiently and degassing the polymer solution, the evaporation amount of the solvent can be suppressed and a polymer solution of a good quality can be obtained.

Further, according to the method for producing a porous film of this invention, the evaporation amount of the solvent can be suppressed and the film-forming starting solution can be prepared within a shorter period of time so that a good-quality porous film can be produced with a high yield.

BRIEF DESCRIPTION OF THE DRAWINGS

FIG. 1 is a schematic view illustrating an example of a production apparatus used in a method for producing a porous film according to this invention.

DESCRIPTION OF THE EMBODIMENTS

<Method for Dissolving and Degassing a Polymer>

The method for dissolving and degassing a polymer of this invention is a method for dissolving a polymer in a solvent and degassing the polymer solution, comprising: a dissolution/degassing step comprising agitating a mixture containing the polymer and a solvent, in a pressure-reduced condition with a gauge pressure of −50 to −90 kPa and at a temperature lower than the boiling point of the solvent in the pressure-reduced condition but higher than the freezing point of the solvent, to dissolve the polymer and simultaneously degas the solution of the polymer, so as to obtain a polymer solution.

Dissolution/Degassing Step:

The method for dissolving and degassing a polymer of a first aspect of this invention comprises: a dissolution/degassing step for obtaining a polymer solution by agitating a mixture containing the polymer and a solvent, while the pressure reduction is ongoing in a pressure-reduced condition with a gauge pressure of −50 kPa to −90 kPa at a temperature lower than the boiling point of the solvent in the pressure-reduced condition but higher than the freezing point of the solvent, to dissolve the polymer and simultaneously degas the solution of the polymer. Thereby, splashing of the polymer due to agitation and carbonization of the splashed polymer due to rotations of the mixer and so on can be suppressed, and dissolution of the polymer and degassing of the polymer solution can be accomplished sufficiently and efficiently.

Herein, "while the pressure reduction is ongoing" means that the pressure reduction means such as a pump is not stopped but is operated for vacuum pumping.

In the method for dissolving and degassing a polymer of this invention, it is possible to set the pressure-reduced condition as follows: the gauge pressure being −50 to −90 kPa, and the temperature at which dissolution of the polymer and degassing of the polymer solution are performed being not higher than the boiling point of the solvent in the pressure-reduced condition and not lower than the freezing point of the solvent.

In view of sufficiently degassing the polymer solution within a short period of time, the gauge pressure of the pressure-reduced condition in the method for dissolving and degassing a polymer of this invention is −50 kPa or below and preferably −70 kPa or below. Moreover, in view of suppressing splashing of the polymer and suppressing carbonization of the polymer due to rotations of the mixer and so on, the gauge pressure of the decompression conditions is −90 kPa or above and preferably −80 kPa or above.

That is, the gauge pressure is preferably −50 to −90 kPa and more preferably −60 to −80 kPa.

Furthermore, the method for dissolving and degassing a polymer according to a second aspect of this invention comprises: a dissolution/degassing step in which, after the dissolution/degassing device in a sealed state is reduced in pressure to a pressure-reduced condition with a gauge pressure of −50 to −90 kPa, the pressure reduction means is temporarily stopped, and a mixture containing a polymer and a solvent is agitated, while the pressure-reduced condition is maintained, at a temperature lower than the boiling point of the solvent in the pressure-reduced condition but higher than the freezing point of the same to dissolve the polymer and simultaneously degas the solution of the polymer, so as to obtain the polymer solution.

In the method for dissolving and degassing a polymer according to the second aspect of this invention, the agitation in the pressure-reduced condition with a gauge pressure of −50 to −90 kPa helps to dissolve the polymer in the solvent and, to some extent, also helps degassing of the polymer solution.

Thus, the time necessary for dissolving the polymer and degassing the polymer solution can be further shortened.

Further, in the method for dissolving and degassing a polymer according to the second aspect of this invention, the pressure reduction is stopped after the gauge pressure becomes −50 to −90 kPa, and agitation is performed while the pressure-reduced condition is maintained. Therefore, evaporation of the solvent out of the device in the pressure-reduced condition during the dissolution/degassing process can be suppressed, so a constant concentration of the polymer solution can be ensured.

Further, gelation of the polymer solution can be suppressed easily.

In the method for dissolving and degassing a polymer according to the second aspect, it is possible that either (1) the pressure reduction is performed after the agitation of the mixture containing the polymer and the solvent begins, and the pressure reduction means is stopped when a pressure-reduced condition with a gauge pressure of −50 to −90 kPa is reached; or (2) the pressure reduction means is stopped when a pressure-reduced condition with a gauge pressure of −50 to −90 kPa is achieved, and then the mixture containing the polymer and the solvent is agitated to dissolve the polymer and degas the polymer solution.

In view of the solubility of the polymer, it is preferred in either of the cases (1) and (2) that the polymer is added into the solvent after the solvent is put into the dissolution/degassing device and the agitation begins.

In the method for dissolving and degassing a polymer of this invention, the polymer used is preferably at least one polymer selected from a powder-like polymer and a pellet-like polymer. Further, when the pellet-like polymer and the powder-like polymer are used, it is preferred that, after the powder-like polymer is added into the solvent and dissolved, the pellet-like polymer is added and the mixture is agitated by the agitation device to dissolve the pellet-like polymer in the solvent, in order to increase the solubility of the pellet-like polymer.

The temperature at which the polymer is dissolved in the solvent and the polymer solution is degassed is set to be lower than the boiling point of the solvent in the pressure-reduced condition but higher than the freezing point of the same. This can suppress splashing of the polymer due to boiling of the solvent and carbonization of the splashed polymer due to rotations of the mixer and so on.

The temperature may be chosen depending on the kind of the solvent used or the vacuum degree (i.e., the pressure-reduced condition), and is preferably 50° C. to 90° C. and more preferably 60° C. to 80° C. If the temperature is at or above the lower limit, the polymer can be dissolved more efficiently. If the temperature is at or below the upper limit, splashing of the polymer and carbonization due to rotations of the mixer and so on can be suppressed easily.

More specifically, if the solvent is N,N-dimethyl acetamide, it is preferred that the pressure-reduced condition is −50 to −90 kPa and the temperature is 50° C. to 90° C., and more preferred that the pressure-reduced condition is −60 to −80 kPa and the temperature is 60° C. to 80° C. If the solvent is 4-methyl-2-pyrrolidone, it is preferred that the pressure-reduced condition is −50 to −90 kPa and the temperature is 50° C. to 90° C., and more preferred that the pressure-reduced condition is −60 to −80 kPa and the temperature is 60° C. to 80° C.

Further, the mass ratio (polymer:solvent) of the polymer to the solvent is preferably 20:80 to 50:50 and more preferably 25:75 to 40:60.

The agitation time in the dissolution/degassing step of this invention may be any period of time that allows for sufficient dissolution of the polymer and degassing of the polymer solution, and may be determined appropriately in consideration of conditions such as the vacuum degree and the temperature. The agitation time is preferably 30 to 360 minutes and more preferably 60 to 240 minutes.

As the pressure reduction means used in the method for dissolving and degassing a polymer of this invention, for example, a vacuum pump capable of vacuum pumping may be used. As a specific example, an FT4-50 three-blade ANLET ROOTS dry-type vacuum pump made by ANLET Co., Ltd or the like may be used.

The dissolution/degassing device used in the method for dissolving and degassing of this invention may be a device that can be combined with the pressure reduction means such as a vacuum pump capable of vacuum pumping to pressure-reduce the interior of the device to a specified vacuum degree, can regulate the interior of the device to a specified temperature, and can agitate the mixture containing the polymer and the solvent.

As a specific example, for example, the T. K. Combi Mix S-300 dissolution pot made by Primix Corporation may be used. The agitating speed in the dissolution/degassing step varies with the kind and size of the mixer, but in view of increasing the dissolving efficiency of the polymer, is preferably 700 rpm or above and more preferably 1300 rpm or above.

Further, in view of easily suppressing splashing of the polymer and suppressing carbonization due to rotations of the mixer and so on, the agitating speed is preferably 1800 rpm or below and more preferably 1600 rpm or below.

That is, the agitating speed is preferably 700 to 1800 rpm and more preferably 1300 to 1600 rpm.

As the agitation device (mixer) used in the method for dissolving and degassing of this invention, a three-axis mixer comprising a scraping mixer, a dispersing mixer and a homo-mixer may be used. By using the three-axis mixer, the dissolving and degassing can be accomplished more efficiently than in cases where a uni-axis mixer or a bi-axis mixer is used.

The so-called scraping mixer refers to a mixer that moves a highly viscous mixture into an action range of a high-speed mixer for homogeneous agitation, mixing and thermal conduction. Even a highly viscous mixture can be mixed and agitated entirely in the dissolution/degassing container. When a polymer solution which may be tackified due to a drop in temperature is to be produced, a scraper is preferably provided to scrape away the thermally conductive boundary film on the inner walls of the dissolution/degassing container. The scraper is preferably made of Teflon.

The so-called dispersing mixer refers to a mixer that comprises a turbine rotating at a high speed and a stator and can make a discharge flow without non-uniformity so that the polymer can be dispersed in the solvent homogenously. By means of the strong shearing, impacting and cavitation generated when the mixture passes through a clearance (about 0.5 mm) between the turbine blades rotating at a high speed and the stator, the polymer can be dispersed in the solvent uniformly.

The so-called homo-mixer refers to a mixer that can disperse the polymer uniformly in the solvent and is suitable for agitating the mixture. As a disc which is called a disper rotates, the mixture is agitated to disperse the polymer in the solvent. The disper has blades which are fabricated into saw-tooth forms at the periphery of the disc. By using the blades, the polymer can be dispersed in the solvent.

The rotational speed of the scraping mixer is 10 to 22 $\min^{-1}$, and the rotational speed of the dispersing mixer and the homo-mixer is 750 to 1400 $\min^{-1}$. By having the scraping mixer that requires a high torque rotate at a low rotational speed and having the other mixers that requires high-speed rotation rotate at a high speed, efficient dissolving and degassing can be accomplished.

It is preferred that the rotational speed of the dispersing mixer and the homo-mixer are increased stepwise with an interval of 1 to 300 seconds from 750 $\min^{-1}$. By fulfilling this condition, a high rotational speed can be set without causing damage to the agitation device when a highly viscous solution is agitated. The term "stepwise" herein means that the rotational speed is increased by 10 to 100 $\min^{-1}$ every 1 to 300 seconds.

Further, it is preferred that the scraping mixer is provided with a scraper for scraping away the polymer adhering to the inner walls of the dissolution/degassing container. By fulfilling this condition, the highly viscous polymer solution adhering to the inner wall surfaces of the dissolving container can be scraped away easily in a physical way.

Preferably, the agitation by the mixer in the dissolution/degassing step adopts a relatively low rotational speed at an initial stage of adding the polymer, and then the rotation speed is gradually increased. In this way, the burden on the dissolution/degassing device is eased, so troubles of the dissolution/degassing device can be suppressed easily.

Particularly, the following way is preferred for the agitation: after the rotational speed of the mixer is set to be 700 to 900 rpm and the film-forming resin and the pore former are added and agitated for a certain period of time, the rotational speed of the mixer is increased to 1000 to 1400 rpm, and then the pressure reduction begins.

Specifically, the following way is more preferred for the agitation: after the rotational speed of the mixer is set to be 700 to 900 rpm and the polymer is added and agitated for 0.1 to 0.5 h, the rotational speed of the mixer is increased to 1000 to 1400 rpm, and then the pressure reduction begins.

Degassing Step:

The method for dissolving and degassing a polymer according to a second aspect of this invention preferably comprises a degassing step for, after the dissolution/degassing step, agitating the polymer solution for degassing, while the pressure reduction is ongoing in a pressure-reduced condition of −50 to −90 kPa, at a temperature lower than the boiling point of the solvent in the pressure-reduced condition but higher than the freezing point of the same.

By agitating the polymer solution for degassing while the pressure reduction is ongoing in the pressure-reduced condition, high degassing efficiency can be obtained and sufficient degassing can be accomplished within a shorter period of time.

Then, as the degassing time become shorter, the evaporation amount of the solvent during the degassing process is reduced.

Here, "while the pressure reduction is ongoing" refers to a state in which the pressure reduction means such as a vacuum pump is operating for vacuum pumping.

In view of increasing the efficiency of degassing the polymer solution so that sufficient degassing can be accomplished within a shorter time to reduce the evaporation amount of the solvent, the gauge pressure of the pressure-reduced condition in the degassing step is −50 kPa or below, preferably −60 kPa or below, and more preferably, −70 kPa or below.

Further, in view of easily suppressing splashing of the polymer and carbonization due to rotations of the mixer and so on, the gauge pressure of the pressure-reduced condition in the dissolution/degassing step is preferably −90 kPa or above and more preferably −80 kPa or above.

In the dissolution/degassing step, for example, when the gauge pressure is to be decreased to a high vacuum degree of −80 kPa or below, the pressure reduction may also be accomplished by vacuum pumping.

Further, for the same reasons as in the dissolution/degassing step, the temperature of the polymer solution in the degassing step is set to be lower than the boiling point of the solvent in the pressure-reduced condition but higher than the freezing point of the same.

The temperature may be chosen according to the kind of the solvent used or the pressure-reduced condition, and is preferably 50° C. to 90° C. and, more preferably, 60° C. to 80° C.

If the temperature is at or above the lower limit, the dissolution of the polymer can be accomplished more efficiently.

If the temperature is at or below the upper limit, splashing of the polymer and carbonization due to rotations of the mixer and so on can be easily suppressed.

More specifically, if the solvent is N,N-dimethyl acetamide, it is preferred that the pressure-reduced condition in the dissolution/degassing step is −50 to −90 kPa and the temperature is 50° C. to 90° C., and more preferred that the pressure-reduced condition in the dissolution/degassing step is −60 to −80 kPa and the temperature is 60° C. to 80° C. If the solvent is N,N-dimethyl acetamide, it is preferred that the pressure-reduced condition in the degassing step is −50 to −90 kPa and the temperature is 50° C. to 90° C., and more preferred that the pressure-reduced condition in the degassing step is −60 to −80 kPa and the temperature is 60° C. to 80° C.

If the solvent is 4-methyl-2-pyrrolidone, it is preferred that the pressure-reduced condition in the dissolution/degassing step is −50 to −90 kPa and the temperature is 50° C. to 90° C., and more preferred that the pressure-reduced condition in the dissolution/degassing step is −60 to −80 kPa and the temperature is 60° C. to 80° C. If the solvent is 4-methyl-2-pyrrolidone, it is preferred that the pressure-reduced condition in the degassing step is −50 to −90 kPa and the temperature is 50° C. to 90° C., and more preferred that the pressure-reduced condition in the dissolution/degassing step is −60 to −80 kPa and the temperature is 60° C. to 80° C. Also, the mass ratio (polymer:solvent) of polymer to solvent is preferably 20:80 to 50:50 and more preferably 25:75 to 40:60.

In view of reducing the evaporation amount of the solvent, the agitation time in the degassing step is preferably within 60 sec and more preferably within 40 sec.

Further, in view of easily obtaining a sufficiently degassed polymer solution, the agitation time in the degassing step is preferably 10 sec or more and more preferably 20 sec or more.

That is, the agitation time in the degassing step is preferably 10 to 60 sec and more preferably 20 to 40 seconds.

The agitating speed in the degassing step also varies according to the kind and size of the mixer, but in view of increasing the dissolution efficiency of the polymer, is preferably 700 rpm or above and more preferably 1300 rpm or above.

Further, in view of easily suppressing splashing of the polymer and carbonization of the polymer due to rotations of the mixer and so on, the agitating speed is preferably 1800 rpm or below and more preferably 1600 rpm or below.

That is, the agitating speed in the degassing step is preferably 700 to 1800 rpm and more preferably 1300 to 1600 rpm.

The polymer and the solvent that can be used in the method for dissolving and degassing of this invention are not particularly limited as long as the polymer can be dissolved in the solvent to form a polymer solution. For example, a combination of the film-forming resin, the pore former and the solvent of the film-forming starting solution used in production of the porous film described later may be used.

The device that can be used in the method for dissolution/degassing of this invention is not particularly limited as long as it can pressure-reduce the interior of the device to a specified vacuum degree, regulate the interior of the device to a specified temperature and agitate a mixture containing the polymer and the solvent to perform dissolution and degassing simultaneously. As a specific example, for example, the T. K. Combi Mix S−300 dissolving pot made by Primix Corporation may be used.

In the method for dissolving and degassing a polymer of this invention described above, agitation is performed while the pressure reduction is ongoing in a pressure-reduced condition of a high vacuum degree (i.e., a gauge pressure of −50 to −90 kPa) to degas the polymer solution. In this way, a high degassing efficiency can be obtained to shorten the time necessary for degassing the polymer solution.

Then, as the time necessary for degassing is shortened, the evaporation amount of the solvent is reduced and the gelation phenomenon is also suppressed, so a polymer solution of a high quality can be obtained.

Since the method for dissolving and degassing a polymer of this invention can efficiently dissolve the polymer in the solvent and degas the polymer solution, the evaporation amount of the solvent can be suppressed and a polymer solution of a good quality can be obtained.

Additionally, the method for dissolving and degassing a polymer according to a third aspect of this invention is not limited to the aforesaid method as long as it comprises the degassing step described in the second aspect.

For example, it may alternatively be a method in which, after a dissolving step of dissolving the polymer in the solvent at the atmospheric pressure to obtain the polymer solution, the degassing step as described in the second aspect is performed.

Even for the aforesaid method, the time necessary for degassing the polymer solution may also be shortened through the degassing step. This can not only reduce the evaporation amount of the solvent, but also provide a polymer solution of a good quality for which dissolution of the polymer and degassing of the polymer solution have been done sufficiently.

<Porous Film Production Method>

The porous film production method of this invention may be either a method of producing a porous film having a porous film layer outside a reinforcing support, or a method of producing a porous film having a porous film layer without having a reinforcing support. Further, the method for producing a porous film of this invention may be either a method of producing a porous film having a single porous film layer, or a method of producing a porous film having multiple porous film layers. Further, the porous film of this invention may be either a porous hollow-fiber film obtained by using a spinning nozzle as a discharge means or a sheet-like or film-like porous flat film.

As the reinforcing support, a hollow braided band or knitted band or the like may be used, for example, in the case of a porous hollow-fiber film. On the other hand, in the case of a porous flat film, a piece of woven cloth, non-woven cloth or a net comprising various fibers or resins may be used. As fibers used for these supports, synthetic fibers, semi-synthetic fibers, recycled fibers, natural fibers or the like may be used. The fibers may be any of monofilament fibers, multifilament fibers and spun yarns. Furthermore, the various materials may be used alone or in combination.

In the method for producing a porous film of this invention, a film-forming starting solution containing a film-forming resin, a pore former and a solvent is used. By immersing the film-forming starting solution into a Solidification liquid described later, the Solidification liquid diffuses in the film-forming starting solution A. As a result, the film-forming resin and the pore former are phase separated and solidified respectively to form a porous film layer having a 3D network structure in which the film-forming resin and the pore former are mixed with each other. In this stage, it is speculated that the pore former in a gel state is intertwined with the film-forming resin three-dimensionally.

As the film-forming resin, a resin typically used to form a porous film layer of a porous film may be used, for example, a hydrophobic polymer such as a polysulfone resin, a polyether sulfone resin, a sulfonated polysulfone resin, a polyvinylidene fluoride resin, a polyacrylonitrile resin, a polyimide resin, a polyamide imide resin, or a polyester imide resin. These polymers may be appropriately chosen as desired, and the polyvinylidene fluoride resin is preferred because of its superior chemical resistance.

The film-forming resins may be used alone or in a combination of two or more.

As the pore former, a polymer resin such as a polyethylene glycol derivative of monool type, polyethylene glycol of diol type, a polyethylene glycol derivative of triol type, polyvinyl pyrrolidone or the like may be used, for example. Herein, the so-called monool type means that there is one hydroxyl, the so-called diol type means that there are two hydroxyls, and the so-called triol type means that there are three hydroxyls. These polymer resins may be appropriately chosen as desired, and a hydrophilic polymer is preferred because, by degassing and agitating the hydrophilic polymer together with a hydrophobic polymer, a porous film layer having a 3D network structure can be preferably formed after solidification. Among the hydrophilic polymers, polyvinyl pyrrolidone is particularly preferred because of its superior tackifying effect.

These pore formers may be used alone or in a combination of two or more.

The solvent is not particularly limited as long as it can dissolve both the film-forming resin and the pore former. For example, dimethyl sulfoxide, N,N-dimethyl acetamide, dimethyl formamide or 4-methyl-2-pyrrolidone may be used. For superior solubility of the film-forming resin and the solvent in the solvent, N,N-dimethyl acetamide and 4-methyl-2-pyrrolidone are preferred, and N,N-dimethyl acetamide are more preferred.

These solvents may be used alone or in a combination of two or more.

Additionally, in addition to the pore former, other additives and an adjuvant solvent such as water may also be used as arbitrary ingredients in the film-forming starting solution used herein, provided that the additives and the adjuvant solvent will not interfere with controlling of the phase separation.

The arbitrary ingredients described above are preferably added before the polymer is added into the solvent.

Hereinafter, a porous hollow-fiber film production method using a production device 1 described below will be described as an embodiment of the porous film production method of this invention.

As shown in FIG. 1, the production apparatus 1 comprises: a starting solution preparation means 10 for dissolving polymers such as the film-forming resin and the pore former in a solvent and degassing the polymer solution to prepare a film-forming starting solution; a retaining part 12 for retaining the film-forming starting solution; a support supply means 14 for supplying a reinforcing hollow support to a spinning means 16 described later; the spinning means 16 for spinning by applying the film-forming starting solution, which is supplied from the retaining part 12, onto an outer surface of the reinforcing support supplied from the support supply means 14; a solidification means 18 for solidifying the film-forming starting solution in a Solidification liquid to form a porous hollow-fiber film M; a cleaning means 20 for removing the solvent remaining in the porous hollow-fiber film M; a removal means 22 for removing the pore former remaining in the porous hollow-fiber film M; a drying means 24 for drying the porous hollow-fiber film M; and a winding means 26 for winding the porous hollow-fiber film M. The movement of the porous hollow-fiber film M in the production apparatus 1 is regulated by a guiding member 28.

The method for producing a porous hollow-fiber film of this embodiment comprises a starting solution preparation step, a spinning step, a solidification step, a cleaning step, a removal step, a drying step and a winding step described hereinafter.

Starting solution preparation step: a step of using the starting solution preparation means 10 to prepare a film-forming starting solution A by agitating a mixture containing a polymer and a solvent, in a pressure-reduced condition with a gauge pressure of −50 to −90 kPa and at a temperature lower than the boiling point of the solvent in the pressure-reduced condition but higher than the freezing point of the same, to dissolve the polymer and simultaneously degas the polymer solution.

Solidification step: a step of using the spinning means 16 to spin by applying the film-forming starting solution A to an outer surface of the reinforcing hollow support B (hereinafter called a "reinforcing support B") and using the solidification means 18 to solidify the film-forming starting solution A in the Solidification liquid 18a to form the porous hollow-fiber film M.

Cleaning step: a step of using the cleaning means 20 to clean the porous hollow-fiber film M to remove the solvent remaining in the porous hollow-fiber film M.

Removal step: a step of using the removing means 22 to remove the pore former remaining in the porous hollow-fiber film M.

Drying step: a step of using the drying means 24 to dry the porous hollow-fiber film M.

Winding step: a step of using the winding means 26 to wind the dried porous hollow-fiber film M.

That is, the method for producing a porous hollow-fiber of this embodiment is characterized in comprising: a solidification step for solidifying the polymer solution, which is obtained with the above dissolving and degassing method, in the Solidification liquid to form a porous film; a cleaning step for cleaning the porous film to remove the solvent remaining in the porous film; a removal step for removing the pore former remaining in the porous film; a drying step for drying the porous film; and a winding step for winding the porous film, wherein the polymer solution comprises the film-forming resin, the pore former and the solvent.

As the starting solution preparation step, a starting solution preparation step 1 or a starting solution preparation step 2 may be used.

Starting Solution Preparation Step 1:

In the starting solution preparation means 10, a mixture containing the film-forming resin and the pore former as the polymer and the solvent is agitated, while the pressure reduction is ongoing in a pressure-reduced condition, at a temperature lower than the boiling point of the solvent in the pressure-reduced condition but higher than the freezing point of the same to dissolve the film-forming resin and the pore former and simultaneously degas the polymer solution to prepare the film-forming starting solution A, and then the film-forming starting solution A is retained in the retaining part 12.

Herein, "while the pressure reduction is ongoing" means that the pressure reduction means such as a pump is not stopped but is operated for vacuum pumping.

In view of sufficiently degassing the film-forming starting solution A within a short period of time, the gauge pressure of the pressure-reduced condition is −50 kPa or below and preferably −70 kPa or below. Moreover, in view of suppressing splashing of the film-forming resin and the pore former and suppressing carbonization of the film-forming resin and the pore former in the starting solution preparation means 10 due to rotations of the mixer and so on, the gauge pressure of the pressure-reduced condition is −90 kPa or above and preferably −80 kPa or above.

That is, the pressure-reduced condition is preferably −50 to −90 kPa and more preferably −60 to −80 kPa.

The temperature at which the film-forming resin and the pore former are dissolved in the solvent and the polymer solution is degassed is set to be lower than the boiling point of the solvent in the pressure-reduced condition but higher than the freezing point of the same. This can suppress splashing of the film-forming resin and the pore former due to boiling of the solvent and carbonization of the film-forming resin and the pore former due to rotations of the mixer and so on.

The temperature may be chosen according to the kind of the solvent used or the vacuum degree, and is preferably 50° C. to 90° C. and more preferably 60° C. to 80° C. If the temperature is at or above the lower limit, the film-forming resin and the pore former can be dissolved in the solvent more efficiently. If the temperature is at or below the upper limit, splashing of the film-forming resin and the pore former and carbonization of the film-forming resin and the pore former due to rotations of the mixer and so on can be suppressed easily.

More specifically, if the solvent is N,N-dimethyl acetamide, it is preferred that the pressure-reduced condition is −50 to −90 kPa and the temperature is 50° C. to 90° C., and more preferred that the pressure-reduced condition is −60 to −80 kPa and the temperature is 60° C. to 80° C. If the solvent is 4-methyl-2-pyrrolidone, it is preferred that the pressure-reduced condition is −50 to −90 kPa and the temperature is 50° C. to 90° C., and more preferred that the pressure-reduced condition is −60 to −80 kPa and the temperature is 60° C. to 80° C.

Further, the mass ratio (polymer:solvent) of the polymer to the solvent is preferably 20:80 to 50:50 and more preferably 25:75 to 40:60.

The agitation time may be any period of time that allows for sufficient dissolution of the film-forming resin and the pore former and degassing of the film-forming starting solution, and may be determined appropriately according to conditions such as the vacuum degree and the temperature. The agitation time is preferably 30 to 360 minutes and more preferably 60 to 240 minutes.

The agitating speed in the dissolution/degassing step 1 varies with the kind and size of the mixer, but in view of increasing the dissolving efficiency of the film-forming resin and the pore former, is preferably 700 rpm or above and more preferably 1300 rpm or above.

Further, in view of easily suppressing splashing of the film-forming resin and the pore former and suppressing carbonization of the film-forming resin and the pore former due to rotations of the mixer and so on, the agitating speed is preferably 1800 rpm or below and more preferably 1600 rpm or below.

That is, the agitating speed in the dissolution/degassing step 1 is preferably 700 to 1800 rpm and more preferably 1300 to 1600 rpm.

As the starting solution preparation means 10, any means that can agitate the mixture containing the film-forming resin, the pore former and the solvent and simultaneously perform dissolution and degassing of the polymer solution to prepare a film-forming starting solution A at the specified pressure-reduced condition and the specified temperature may be used. For example, the T. K. Combi Mix S-300 dissolution pot made by Primix Corporation may be used.

As the mixer in the starting solution preparation means 10, the aforesaid three-axis mixer comprising a scraping mixer, a dispersing mixer and a homo-mixer may be used. The rotational speeds of the scraping mixer, the dispersing mixer and the homo-mixer may be set to be the same as those described above.

In view of improving the stability during film formation to form a superior porous film structure easily, the content of the film-forming resin is preferably 10 mass % or above and more preferably 15% or above on the basis of 100 mass % of the film-forming starting solution A. For the same reasons, the content of the film-forming resin is preferably 30 mass % or below and more preferably 25% or below.

That is, the content of the film-forming resin is preferably 10 to 30 mass % and more preferably 15 to 25 mass %.

In view of forming the porous hollow-fiber film M easily, the content of the pore former is preferably 1 mass % or above and more preferably 5 mass % or above on the basis of 100 mass % of the film-forming starting solution A. Furthermore, in view of the operability of the film-forming starting solution A, the content of the pore former is preferably 20 mass % or below and more preferably 15 mass % or below.

That is, the content of the pore former is preferably 1 to 20 mass % and more preferably 5 to 15 mass %.

Starting Solution Preparation Step 2:

In the starting solution preparation means 10, the film-forming resin and the pore former are dissolved as the polymer in the solvent, and the polymer solution is degassed to prepare the film-forming starting solution A The film-forming starting solution A is then retained in the retaining part 12. The starting solution preparation step 2 of this invention is characterized in comprising a degassing step comprising agitating the film-forming starting solution obtained by dissolving the film-forming resin and the pore former in the solvent, while the pressure reduction is ongoing in a pressure-reduced condition of −50 kPa or below, at a temperature lower than the boiling point of the solvent in the pressure-reduced condition but higher than the freezing point of the same. As the starting solution preparation step 2 of the method for producing a porous film of this invention, for example, a step comprising the dissolution/degassing step and the degassing step described below may be used.

The dissolution/degassing step: the pressure reduction means is stopped in a pressure-reduced condition with a gauge pressure of −50 kPa or below, and the mixture containing the film-forming resin, the pore former and the solvent is agitated, while the pressure-reduced condition is maintained, at a temperature lower than the boiling point of the solvent in the pressure-reduced condition but higher than the freezing point of the same to obtain the film-forming starting solution A.

The degassing step: after the dissolution/degassing step, the film-forming starting solution A is agitated, while the pressure reduction is ongoing in the pressure-reduced condition with the gauge pressure of −50 kPa or below, at the temperature lower than the boiling point of the solvent in the pressure-reduced condition but higher than the freezing point of the same.

Herein, "while the pressure reduction is ongoing" means that the pressure reduction means such as a pump is not stopped but is operated for vacuum pumping.

Dissolution/Degassing Step:

By agitating in the pressure-reduced condition with a gauge pressure of −50 to −90 kPa, not only the film-forming resin and the pore former can be dissolved in the solvent, but also the polymer solution can be degassed to some extent.

Thus, the time necessary for dissolving and degassing can be further shortened.

Further, in the dissolution/degassing step, the pressure reduction means is stopped after a pressure-reduced condition with a gauge pressure of −50 to −90 kPa is achieved, and then the agitation is performed while the pressure-reduced condition is maintained. Thus, evaporation of the solvent out of the device due to the pressure reduction during the dissolution/degassing process can be suppressed, so a constant concentration of the film-forming starting solution can be ensured.

Thereby, the evaporation amount of the solvent can be further decreased.

Further, if the film-forming starting solution is agitated for a long time while the pressure reduction is ongoing, the film-forming starting solution tends to gelate. However, by further shortening the time necessary for dissolving and degassing, suppression of gelation of the film-forming starting solution is also made easier.

In the dissolution/degassing step, it is possible that either (1) the pressure reduction is performed after the agitation of the mixture containing the film-forming resin, the fore former and the solvent begins, and the pressure reduction means is stopped when a pressure-reduced condition with a gauge pressure of −50 to −90 kPa is reached; or (2) the pressure reduction means is stopped in a pressure-reduced condition with a gauge pressure of −50 to −90 kPa, and then the agitation of the mixture containing the film-forming resin, the fore former and the solvent begins.

In view of the solubility of the film-forming resin and the fore former, it is preferred in either of the cases (1) and (2) that the film-forming resin and the fore former are added into the solvent after the solvent is added into the starting solution preparation means 10 and the agitation begins.

Further, the film-forming resin and the pore former may suitably have the form of pellets, powders or the like.

Particularly when a pellet-like film-forming resin is used, it is preferred that the pellet-like film-forming resin is added after the powder-like film-forming resin and the pore former have been added into the solvent, in order to increase the solubility of the pellet-like film-forming resin.

Thereby, remaining of the pellet-like film-forming resin near the pipe connections in the starting solution preparation means 10 can be suppressed easily.

For example, when a pellet-like film-forming resin, a powder-like film-forming resin and a powder-like pore former are used, they are added into the solvent preferably in the following sequence: the powder-like film-forming resin, the powder-like pore former and then the pellet-like film-forming resin.

Further, when the film-forming resin and the pore former are to be added into the solvent, it is preferred that they are transferred into separate containers in advance and the masses thereof are measured respectively before being added into the solvent.

Thus, differences of concentrations of the film-forming resin and the pore former from their respective specified concentrations due to metering errors can be easily suppressed to prevent degradation in the quality.

In view of sufficiently degassing the film-forming starting solution A within a short period of time, the gauge pressure of the pressure-reduced condition in the dissolution/degassing step is −50 kPa or below and preferably −70 kPa or below. Moreover, in view of suppressing splashing of the film-forming resin and the pore former and suppressing carbonization thereof due to rotations of the mixer and so on in the starting solution preparation means 10, the gauge pressure of the pressure-reduced condition is −90 kPa or above and preferably −80 kPa or above.

Specifically, the gauge pressure is preferably −50 to −90 kPa and more preferably −60 to −80 kPa.

The temperature at which the film-forming resin and the pore former are dissolved in the solvent and the polymer solution is degassed is set to be lower than the boiling point of the solvent in the pressure-reduced condition but higher than the freezing point of the solvent. This can suppress splashing of the film-forming resin and the pore former due to boiling of the solvent and carbonization of the film-forming resin and the pore former due to rotations of the mixer and so on.

The temperature may be chosen according to the kind of the solvent used or the vacuum degree, and is preferably 50° C. to 90° C. and more preferably 60° C. to 80° C. If the temperature is at or above the lower limit, the film-forming resin and the pore former can be dissolved in the solvent more efficiently. If the temperature is at or below the upper limit, splashing of the film-forming resin and the pore former and carbonization of the film-forming resin and the pore former due to rotations of the mixer and so on in the starting solution preparation means 10 can be suppressed easily.

The agitation time in the dissolution/degassing step may be any period of time that allows for sufficient dissolution of the film-forming resin and the pore former and degassing of the polymer solution, and may be determined appropriately according to conditions such as the vacuum degree and the temperature. The agitation time is preferably 30 to 360 minutes and more preferably 60 to 240 minutes.

As the starting solution preparation means 10, any means that can agitate the mixture containing the film-forming resin, the pore former and the solvent and simultaneously perform dissolution and degassing of the polymer solution at the specified pressure-reduced condition and the specified temperature to prepare the film-forming starting solution A may be used. For example, the T. K. Combi Mix S-300 dissolution pot made by Primix Corporation may be used.

The agitating speed in the dissolution/degassing step also varies with the kind and size of the mixer, but in view of increasing the dissolution efficiency of the film-forming resin and the pore former, is preferably 700 rpm or above and more preferably 1300 rpm or above.

Further, in view of easily suppressing splashing of the film-forming resin and the pore former and suppressing carbonization thereof due to rotations of the mixer and so on, the agitating speed is preferably 1800 rpm or below and more preferably 1600 rpm or below.

That is, the agitating speed in the dissolution/degassing step is preferably 700 to 1800 rpm and more preferably 1300 to 1600 rpm.

Preferably, the agitation by the mixer in the starting solution preparation means 10 adopts a relatively low rotational speed at an initial stage of adding the film-forming resin and the pore former, and then the rotation speed is gradually increased.

In this way, the burden on the starting solution preparation means 10 is eased, so troubles of the starting solution preparation means 10 can be suppressed easily.

Particularly, the following way is preferred for the agitation: after the rotational speed of the mixer is set to be 700 to 900 rpm and the film-forming resin and the pore former are added and agitated for a certain period of time, the rotational speed of the mixer is increased to 1000 to 1400 rpm, and then the pressure reduction begins.

Specifically, the following way is more preferred for the agitation: after the rotational speed of the mixer is set to be 700 to 900 rpm and the film-forming resin and the pore former are added and agitated for 0.1 to 0.5 h, the rotational speed of the mixer is increased to 1000 to 1400 rpm, and then the pressure reduction begins.

As the mixer in the starting solution preparation means 10, the aforesaid three-axis mixer comprising a scraping mixer, a dispersing mixer and a homo-mixer may be used. The rotational speeds of the scraping mixer, the dispersing mixer and the homo-mixer may be set to be the same as those described above.

Degassing Step:

After the dissolution/degassing step 2, the film-forming starting solution A is agitated to be degassed, while the pressure reduction is ongoing in a pressure-reduced condition of −50 to −90 kPa, at a temperature lower than the boiling point of the solvent in the pressure-reduced condition but higher than the freezing point of the same.

By agitating the film-forming starting solution A for degassing while the pressure reduction is ongoing in the pressure-reduced condition of −50 to −90 kPa, superior degassing efficiency can be obtained and sufficient degassing can be accomplished within a shorter period of time.

Since the degassing time become shorter, the evaporation amount of the solvent during the degassing process is reduced.

Also, gelation of the film-forming starting solution A is suppressed.

Herein, "while the pressure reduction is ongoing" refers to a state in which the pressure reduction means such as a vacuum pump is not stopped but is operated for vacuum pumping.

In view of obtaining a sufficiently degassed film-forming starting solution A within a shorter period of time, the gauge pressure of the pressure-reduced condition in the degassing step is −50 kPa or below, preferably −60 kPa or below and more preferably −70 kPa or below.

Further, in view of easily suppressing splashing of the film-forming resin and the pore former and carbonization thereof due to rotations of the mixer and so on, the gauge pressure of the pressure-reduced condition in the dissolution/degassing step is preferably −90 kPa or above and more preferably −80 kPa or above.

That is, the pressure-reduced condition in the dissolution/degassing step is preferably −50 to −90 kPa and more preferably −60 to −80 kPa.

Further, for the same reasons as in the dissolution/degassing step, the temperature of the film-forming starting solution A in the degassing step is set to be lower than the boiling point of the solvent in the pressure-reduced condition but higher than the freezing point of the same.

The temperature may be chosen according to the kind of the solvent used or the pressure-reduced condition, and is preferably 50° C. to 90° C. and more preferably 60° C. to 80° C.

If the temperature is at or above the lower limit, the dissolution of the film-forming resin and the pore former can be accomplished more efficiently.

If the temperature is at or below the upper limit, splashing of the film-forming resin and the pore former and carbonization thereof due to rotations of the mixer and so on can be easily suppressed.

More specifically, if the solvent is N,N-dimethyl acetamide, it is preferred that the pressure-reduced condition in the dissolution/degassing step is −50 to −90 kPa and the temperature is 50° C. to 90° C., and more preferred that the pressure-reduced condition in the dissolution/degassing step is −60 to −80 kPa and the temperature is 60° C. to 80° C. If the solvent is N,N-dimethyl acetamide, it is preferred that the pressure-reduced condition in the degassing step is −50 to −90 kPa and the temperature is 50° C. to 90° C., and more preferred that the pressure-reduced condition in the degassing step is −60 to −80 kPa and the temperature is 60° C. to 80° C.

If the solvent is 4-methyl-2-pyrrolidone, it is preferred that the pressure-reduced condition in the dissolution/degassing step is −50 to −90 kPa and the temperature is 50° C. to 90° C., and more preferred that the pressure-reduced condition in the dissolution/degassing step is −60 to −80 kPa and the temperature is 60° C. to 80° C. If the solvent is 4-methyl-2-pyrrolidone, it is preferred that the pressure-reduced condition in the degassing step is −50 to −90 kPa and the temperature is 50° C. to 90° C., and more preferred that the pressure-reduced condition in the dissolution/degassing step is −60 to −80 kPa and the temperature is 60° C. to 80° C. Additionally, the mass ratio (polymer:solvent) of the polymer to the solvent is preferably 20:80 to 50:50, and more preferably 25:75 to 40:60.

In view of further reducing the evaporation amount of the solvent, the agitation time in the degassing step is preferably within 60 seconds and more preferably within 40 seconds.

Further, in view of easily obtaining a sufficiently degassed film-forming starting solution A, the agitation time in the degassing step is preferably 10 seconds or more and more preferably 20 seconds or more.

That is, the agitation time in the degassing step is preferably 10 to 60 seconds and more preferably 20 to 40 seconds.

In view of improving the stability during film forming to font a superior porous film structure easily, the content of the film-forming resin is preferably 10 mass % or above and more preferably 15% or above on the basis of 100 mass % of the film-forming starting solution A. For the same reasons, the content of the film-forming resin is preferably 30 mass % or below and more preferably 25% or below on the basis of 100 mass % of the film-forming starting solution A.

That is, the content of the film-forming resin is preferably 10 to 30 mass % and more preferably 15 to 25 mass % on the basis of 100 mass % of the film-forming starting solution A.

In view of forming the porous hollow-fiber film M easily, the content of the pore former is preferably 1 mass % or above and more preferably 5 mass % or above on the basis of 100 mass % of the film-forming starting solution A. Furthermore, in view of operability of the film-forming starting solution A, the content of the pore former is preferably 20 mass % or below and more preferably 15 mass % or below.

That is, the content of the pore former is preferably 1 to 20 mass % and more preferably 5 to 15 mass % on the basis of 100 mass % of the film-forming starting solution A.

In view of easily suppressing degradation in the fluidity due to curing of the film-forming starting solution A and degradation in the viscosity due to gelation of the film-forming starting solution A so as to prevent degradation in the quality of the obtained porous hollow-fiber film M, the content of water is preferably 0 to 1 mass % and more preferably 0 to 0.5 mass % on the basis of 100 mass % of the film-forming starting solution A.

The content of water in the film-forming starting solution A may be adjusted by using a film-forming resin, a pore former and a solvent that contain less water.

The starting solution preparation step may be either of the starting solution preparation step 1 and the starting solution preparation step 2.

Solidification Step:

The film-forming starting solution A supplied from the retaining part 12 is discharged in a cylindrical form by the spinning means 16, and is applied on an outer side of the reinforcing support B supplied from the support supply means 14 to spin. Then in the solidification means 18, the film-forming starting solution is solidified in the solidifying liquid 18a to form the porous hollow-fiber film M.

The film-forming starting solution A in the spinning step is preferably at a temperature of 20° C. to 40° C.

As the spinning means 16, a well-known spinning nozzle (e.g., a bi-annular nozzle) used in production of a porous hollow-fiber film may be used.

Additionally, when a porous flat film is to be produced instead of this embodiment, a discharge such as well-known T-die may be used instead of the spinning nozzle 16.

In the production device 1 illustrated in FIG. 1, a dry-jet wet-spinning process where an idling zone is disposed between the spinning nozzle and the Solidification liquid is adopted. However, this invention is not limited to the configuration, and a wet spinning process that spins the film-forming starting solution in the Solidification liquid directly without disposing an idling zone may also be adopted.

The solidification liquid 18a must be a solvent that does not dissolve the film-forming resin but sufficiently dissolves the pore former. As the solidification liquid 18a, water, ethanol, methanol or the like, or a mixture thereof may be used. In view of safety and operational management, a mixture of the solvent used in the film-forming starting solution and water is preferred. Specifically, a ration of solvent:water=0:100 to 50:50 is preferred, and solvent:water=5:95 to 30:70 is more preferred.

The solidification liquid 18a is preferably at a high temperature to be suitable for spinodal decomposition. However, when an aqueous solution is used, the temperature is preferably 60° C. to 90° C. in view of preventing concentration due to boiling or evaporation of the solvent.

Cleaning Step:

The pore former or the solvent will remain in a solution state in the porous hollow-fiber film M formed through the solidification step. Especially, if the pore former remains in the film, it would be impossible for the porous hollow-fiber film M to provide adequate water permeability. Moreover, if the pore former becomes dried in the film, degradation in the mechanical strength of the film would result. On the other hand, if there is solvent remaining in the porous hollow-fiber film M when an oxidant is used to oxidatively decompose the pore former (into a low molecular weight) in the subsequent removal step, a reaction of the solvent with the oxidant will take place to impede the oxidative decomposition of the pore former. Hence, in this embodiment, the solvent remaining in the porous hollow-fiber film M is removed in the cleaning step after the solidification step, and then the pore former remaining in the porous hollow-fiber film M is removed in the removal step.

In the cleaning step, the porous hollow-fiber film M is cleaned by a cleaning liquid 20a in the cleaning means 20 to remove the solvent remaining in the porous hollow-fiber film M. The solvent in the porous hollow-fiber film M diffuses from inside the film to the surface of the film and then diffuses from the surface of the film into the cleaning liquid 20a. Thus, the solvent is removed from the porous hollow-fiber film M.

As the cleaning liquid 20a, water is preferred because of the desirable cleaning effect thereof. As the water used, the tap water, industrial water, river water, well water or the like water may be used. Furthermore, alcohols, inorganic salts, oxidants, surfactants or the like may also be mixed in the water. Also, as the cleaning liquid 20a, a mixture of the solvent contained in the film-forming starting solution and water may be used. When such a mixture is used, the concentration of the solvent is preferably 10 mass % or below.

In view of increasing the diffusing speed of the solvent remaining in the porous hollow-fiber film M, the temperature of the cleaning liquid 20a is preferably 50° C. or above and more preferably 80° C. or above.

Additionally, in the cleaning step, mainly the solvent is removed from the porous hollow-fiber film M. However, by cleaning the porous hollow-fiber film M, a part of the pore former is also removed.

Removal Step:

In the removal step, the pore former remaining in the porous hollow-fiber film M is removed by the removing means 22.

As the removal step, for example, the following step may be conducted: the porous hollow-fiber film M is immersed into a chemical solution containing an oxidant so that the chemical solution is retained in the porous hollow-fiber film M; the porous hollow-fiber film M is heated in a gas atmosphere to oxidatively decompose the pore former; and then the porous hollow-fiber film M is cleaned to remove the pore former that has been decomposed into low molecular weight.

As the oxidant, a hypochlorite, ozone, hydrogen peroxide, a permanganate, a dichromate, a persulfate or the like may be used. Among them, the hypochlorite is preferred in view of the superior decomposability due to strong oxidizability, the superior operability and the low cost thereof. As the hypochlorite, sodium hypochlorite, calcium hypochlorite or the like may be used, wherein sodium hypochlorite is particularly preferred.

In view of easily suppressing oxidative decomposition of the pore former, which remains in the porous hollow-fiber film M, in the chemical solution and easily suppressing further oxidative decomposition of the pore former detached into the chemical solution to cause waste of the oxidant, the temperature of the chemical solution is preferably 50° C. or below and more preferably 30° C. or below. Further, in view of reducing the cost of controlling the chemical solution to a low temperature, the temperature of the chemical solution is preferably 0° C. or above and more preferably 10° C. or above.

In other words, the temperature of the chemical solution is preferably 0° C. to 50° C. and more preferably 10° C. to 30° C.

To heat the porous hollow-fiber film M having the chemical solution retained therein, a heating fluid at the atmospheric pressure is preferably used.

In view of suppressing drying of the oxidant so that the decomposition can be accomplished more efficiently, a fluid having a high relative humidity is preferably used as the heating fluid; i.e., the heating is performed under humid and hot conditions. In this case, the relative humidity of the heating fluid is preferably 80% to 100%, more preferably 90% to 100%, and particularly preferably near 100%.

In order to shorten the processing time during continuous processing, the heating temperature is preferably 50° C. to 100° C. and more preferably 80° C. to 100° C. Further, the heating temperature is preferably 90° C. to 100° C. at the atmospheric pressure.

As the method of removing the pore former that has been decomposed into a low molecular weight, a method of cleaning the porous hollow-fiber film M is preferred. The cleaning method is not particularly limited, and the cleaning method described in the cleaning step may be used.

Drying Step:

The porous hollow-fiber film M is dried by the drying means 24.

As the method of drying the porous hollow-fiber film M, methods typically used to dry porous films may be used. For example, a method of using hot air to dry the porous film may be used. Specifically, the following method may be used, for example: the porous hollow-fiber film M is moved continuously and reciprocatively in a device capable of circulating the hot air at a speed of about several meters per second so that the porous hollow-fiber film M is dried from the outer periphery.

Winding Step:

The dried porous hollow-fiber film M is wound by the winding means 26.

According to the method for producing a porous film of this invention described above, dissolution of the film-forming resin and the pore former in the solvent and degassing can be accomplished efficiently to prepare a film-forming starting solution, so the porous film can be produced with high productivity.

Further, if dissolution of the film-forming resin and the pore former in the solvent and degassing of the film-forming starting solution A are performed at the same time, a problem that the film-forming resin and the pore former may splash and be carbonized due to rotations of the mixer and so on will occur. However, the production method of this invention dissolves the film-forming resin and the pore former and degasses the film-forming starting solution A in the pressure-reduced condition and the temperature described above, so this problem can be suppressed and dissolution of the film-forming resin and the pore former and degassing of the film-forming starting solution A can be accomplished in a highly efficient way. Thereby, evaporation of the solvent and gelation of the film-forming starting solution can be suppressed so that the porous film of a good quality can be produced with high productivity.

The method for producing a porous film of this invention is not limited to the method using the aforesaid production apparatus 1 as long as it comprises a starting solution preparation step in which, in a pressure-reduced condition with a gauge pressure of −50 to −90 kPa and at a temperature lower than the boiling point of the solvent in the pressure-reduced condition but higher than the freezing point of the same, a mixture containing a polymer and a solvent is agitated to dissolve the polymer and simultaneously degas the polymer solution to prepare a film-forming starting solution.

For example, in the starting solution preparation step, the film-forming starting solution may also be prepared by performing the degassing step after the film-forming resin and the pore former have been dissolved in the solvent at the atmospheric pressure.

The method using the production apparatus 1 is a method of producing a hollow-shaped porous hollow-fiber film, but it may also be a method of producing a porous flat film.

EXAMPLES

Hereinafter, this invention will be detailed with reference to examples thereof. This invention is not limited to the following description.

In each of the following Examples 1 to 3 and Comparative Examples 1 and 2, a first film-forming starting solution and a second film-forming starting solution for producing a porous hollow-fiber film having two porous film layers were prepared, and whether the polymer was carbonized and the degassing state were evaluated.

Example 1

Into a 300 L dissolution pot (T. K. Combi Mix S-300 type) made by Primix Corporation, 29.7 kg of PVDF 301F (polyvinylidene fluoride) produced by Arkema Co., Ltd. for use as the film-forming resin, 15.6 kg of PVP-K79 (polyvinyl pyrrolidone) by Japan Catalyst Co., Ltd. for use as the pore former and 112.2 L of N,N-dimethyl acetamide (by Samsung Fine Chemical Co., Ltd.) for use as the solvent were added. After the mixture was agitated under the following conditions, the dissolution pot was pressure-reduced immediately, and dissolving and degassing were performed simultaneously to prepare a first film-forming starting solution.

Agitating conditions: homo-mixer 1325 rpm, homo-disper 1325 rpm, anchor 22 rpm

Agitation time: 3 hours

Pressure-reduced condition: −50 kPa (gauge pressure)

Temperature: 60° C.

Also, a second film-forming starting solution was prepared in the same way as the first film-forming starting solution except that 19 kg of PVDF 301F (polyvinylidene fluoride) by Arkema Co., Ltd. and 18 kg of PVDF 9000HD (polyvinylidene fluoride) by Arkema Co., Ltd. for use as the film-forming resin, 18 kg of PVP-K79 (polyvinyl pyrrolidone) by Japan Catalyst Co., Ltd for use as the pore former and 103 L of N,N-dimethyl acetamide (by Samsung Fine Chemical Co., Ltd.) for use as the solvent were used.

Examples 2 and 3

First film-forming starting solutions and second film-forming starting solutions were prepared in the same way as in Example 1 respectively except that the pressure-reduced condition in the dissolution pot during the dissolution and degassing process were changed as shown in Table 1.

Comparative Examples 1 and 2

First film-forming starting solutions and second film-forming starting solutions were prepared in the same way as in Example 1 respectively except that the pressure-reduced condition in the dissolution pot during the dissolution and degassing process were changed as shown in Table 1.

[Evaluation Method]

1. Carbonization of the Polymer

After preparation of the first film-forming starting solutions and the second film-forming starting solutions was completed, the dissolution pot was visually inspected for existence of polymer carbonization. Cases where no carbide of the polymer was found in both the first film-forming starting solution and the second film-forming starting solution were determined to be "○ (good)", and cases where carbide of the polymer was found in either of the first film-forming starting solution and the second film-forming starting solution were determined to be "x (bad)".

2. Degassing State

The degassed states of the first film-forming starting solutions and the second film-forming starting solutions prepared were visually inspected and evaluated. Cases where no bubble was found in both the first film-forming starting solution and the second film-forming starting solution were determined to be "○ (good)", and cases where bubbles were found in either of the first film-forming starting solution and the second film-forming starting solution were determined to be "x (bad)".

3. Comprehensive Evaluation

Cases where both the carbonization of the polymer and the degassed state of the first film-forming starting solution and the second film-forming starting solution were determined to be "○ (good)" were evaluated as "○ (good)", and cases where either of the carbonization of the polymer and the degassing state was determined to be "x (bad)" were evaluated as "x (bad)".

The evaluation results of the examples are shown in Table 1. Additionally, the boiling points of the N,N-dimethyl acetamide (DMAc) at vacuum degrees of these examples are shown in Table 1.

As shown in Table 1, in Examples 1 to 3 where the dissolving and the degassing were performed simultaneously, in a pressure-reduced condition with a gauge pressure of −50 to −90 kPa and at a temperature lower than the boiling point of the solvent in the pressure-reduced condition, no carbonization of the polymer took place and the degassing was sufficient.

On the other hand, carbonization of the polymer was found in Comparative Example 1 where the pressure-reduced condition was −100 kPa. Furthermore, the degassing was insufficient in Comparative Example 2 featuring an insufficient pressure-reduced condition of −30 kPa.

Example 4

Into a 300 L dissolving pot (T. K. Combi Mix S-300 type) made by Primix Corporation, 112.2 L of N,N-dimethyl acetamide (by Samsung Fine Chemical Co., Ltds) for use as the solvent was added. After the agitation was started (homo-mixer 750 rpm, homo-disper 750 rpm, anchor mixer 10 rpm), 15.6 kg of PVP-K79 (polyvinyl pyrrolidone) by Japan Catalyst Co., Ltd. for use as the pore former was added and then 29.7 kg of PVDF 301F (polyvinylidene fluoride) by Arkema Co., Ltd. for use as the film-forming resin was added.

Next, the agitating speed was increased (homo-mixer 1325 rpm, homo-disper 1325 rpm, anchor mixer 22 rpm) and the pressure reduction was started. When the gauge pressure in the dissolving pot reached −80 kPa, the pressure reduction was stopped and agitation was performed for 3 hours at 60° C.

Thereafter, rotation of the homo-mixer and the homo-disper was stopped, and the rotational speed of the anchor mixer was decreased to 10 rpm. As the pressure reduction was ongoing in a pressure-reduced condition with a gauge pressure of −50 kPa, agitation was performed for 20 seconds at 60° C.

Then, the interior of the dissolving pot was restored to the atmospheric pressure to obtain the film-forming starting solution.

Additionally, the boiling point of DMAc at the gauge pressure of −50 kPa is 140° C.

Comparative Example 3

A film-forming starting solution was obtained in the same way as in Example 4 except that, after the film-forming resin and the pore former were dissolved in the same way as in Example 4, the pressure-reduced condition in the degassing step was set to be at a temperature of 100° C. and a gauge pressure of −100 kPa.

TABLE 1

|  | Example 1 | Example 2 | Example 3 | Comparative Example 1 | Comparative Example 2 |
|---|---|---|---|---|---|
| Pressure-reduced condition (gauge pressure) [kPa] | −50 | −70 | −90 | −100 | −30 |
| Pressure-reduced condition (gauge pressure) [mmHg] | −375 | −525 | −675 | −750 | −225 |
| Boiling point of DMAc [° C.] | 140 | 124 | 102 | 72 | 152 |
| Evaluation Carbonization of polymer | ○ | ○ | ○ | x | ○ |
| Degassing state | ○ | ○ | ○ | ○ | x |
| Comprehensive evaluation | ○ | ○ | ○ | x | x |

Additionally, the boiling point of DMAc at the gauge pressure of −100 kPa is 72° C.

Comparative Example 4

A film-forming starting solution was obtained in the same way as in Example 4 except that, after the film-forming resin and the pore former were dissolved in the same way as in Example 4, the pressure-reduced condition in the degassing step was set to be at a temperature of 30° C. and a gauge pressure of −30 kPa.

Additionally, the boiling point of DMAc at the gauge pressure of −30 kPa is 152° C.

[Evaluation Method]
1. Degassing State

The degassed states of the obtained film-forming starting solutions were visually inspected and evaluated according to the following criteria.

"○ (good)": no bubble was found in the film-forming starting solution.

"x (bad)": bubbles were found in the film-forming starting solution.

The evaluation results of the examples are shown in Table 2.

TABLE 2

|  | Example 4 | Comparative Example 3 | Comparative Example 4 |
|---|---|---|---|
| Weight percentage of solid contents [%] | 30.32 | 31.21 | 30.21 |
| Percentage of remaining solvent [%] | 69.68 | 68.79 | 69.79 |
| Degassing state | ○ | ○ | x |

In Example 4 where agitation was performed for degassing in a pressure-reduced condition with a gauge pressure of −50 to −90 kPa and at a temperature lower than the boiling point of the solvent in the pressure-reduced condition, sufficient degassing could be accomplished within a short period of time and the evaporation amount of the solvent was small.

On the other hand, the following trouble was found in Comparative Example 3 where the degassing was performed at a temperature higher than the boiling point of DMAc: the polymer splashed due to boiling of the solvent and the film-forming resin was carbonized due to rotation of the mixer.

Furthermore, in Comparative Example 4 where the degassing temperature was lower than the boiling point of DMAc but the pressure-reduced condition was insufficient, although the evaporation amount of the solvent was small, a large amount of bubbles were found in the obtained film-forming starting solution.

Industrial Applicability

According to the method for dissolving and degassing a polymer of this invention, during preparation of a film-forming starting solution for forming a porous film for example, the polymer can be dissolved in the solvent efficiently and the polymer solution can be degassed.

According to the method for dissolving and degassing a polymer of this invention, by dissolving the polymer in the solvent efficiently and degassing the polymer solution, the evaporation amount of the solvent can be suppressed and a polymer solution of a good quality can be obtained.

Further, according to the method for producing a porous film of this invention, the evaporation amount of the solvent can be suppressed and the film-forming starting solution can be prepared within a shorter period of time so that a porous film of a good quality can be produced with high productivity.

What is claimed is:

1. A method for producing a porous film, comprising:
   a dissolution/degassing step, comprising agitating a mixture containing the polymer and a solvent, in a pressure-reduced condition with a gauge pressure of −50 to −90 kPa and at a temperature lower than a boiling point of the solvent in the pressure-reduced condition but higher than a freezing point of the solvent, to dissolve the polymer and simultaneously degas a solution of the polymer, so as to obtain a polymer solution; and
   a solidification step for solidifying the obtained polymer solution in a solidification liquid to form the porous film,
   wherein after the pressure-reduced condition with the gauge pressure of −50 to −90 kPa is achieved in the dissolution/degassing step, a pressure reduction means is stopped while the pressure-reduced condition is maintained, and the mixture is agitated at the temperature lower than the boiling point of the solvent in the pressure-reduced condition but higher than the freezing point of the solvent,
   wherein the dissolution/degassing step is performed at a temperature of 50° C. to 90° C., and
   wherein the agitation is performed for 60 to 240 minutes.

2. The method of claim 1, wherein the dissolution/degassing step is performed using, as an agitation device, a three-axis mixer comprising a scraping mixer, a dispersing mixer and a homo-mixer.

3. The method of claim 2, wherein a rotational speed of the scraping mixer is 10 to 22 min$^{-1}$, and a rotational speed of the dispersing mixer and the homo-mixer is 750 to 1400 min$^{-1}$.

4. The method of claim 3, wherein the rotational speed of the dispersing mixer and the homo-mixer is increased stepwise with an interval of 1 to 300 seconds from 750 min$^{-1}$.

5. The method of claim 4, wherein the scraping mixer has a scraper for scraping away the polymer adhering to inner walls of a dissolution/degassing container.

6. The method of claim 5, wherein at least one polymer selected from a powder-like polymer and a pellet-like polymer is used as the polymer.

7. The method of claim 6, wherein the solvent, the powder-like polymer, and the pellet-like polymer are added into the dissolution/degassing container in sequence, and then the mixture begins to be agitated by the agitation device.

8. The method of claim 7, wherein the solvent is N,N-dimethyl acetamide or 4-methyl-2-pyrrolidone.

9. The method of claim 8, wherein the solvent is N,N-dimethyl acetamide.

10. A method for dissolving and degassing a polymer, comprising: a degassing step for, after the dissolution/degassing step according to claim 1, agitating the polymer solution for degassing purpose while the pressure reduction is ongoing in the pressure-reduced condition with the gauge pressure of −50 to −90 kPa at the temperature lower than the boiling point of the solvent in the decompressed state but higher than the freezing point of the solvent.

* * * * *